US012779912B2

(12) United States Patent
Resmini et al.

(10) Patent No.: US 12,779,912 B2
(45) Date of Patent: Nov. 3, 2026

(54) SELF-SUPPORTING TYRE FOR VEHICLE WHEELS

(71) Applicant: Pirelli Tyre S.p.A., Milan (IT)

(72) Inventors: Emiliano Resmini, Milan (IT); Davide Miazzo, Milan (IT); Luca Giannini, Milan (IT); Thomas Hanel, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 557 days.

(21) Appl. No.: 18/001,334

(22) PCT Filed: Jun. 16, 2021

(86) PCT No.: PCT/IB2021/055296

§ 371 (c)(1),
(2) Date: Dec. 9, 2022

(87) PCT Pub. No.: WO2021/255654

PCT Pub. Date: Dec. 23, 2021

(65) Prior Publication Data

US 2023/0234403 A1 Jul. 27, 2023

(30) Foreign Application Priority Data

Jun. 17, 2020 (IT) ........................ 102020000014512
Dec. 23, 2020 (IT) ........................ 102020000032147

(51) Int. Cl.
*B60C 17/00* (2006.01)
*B60C 1/00* (2006.01)
(Continued)

(52) U.S. Cl.
CPC ........ *B60C 17/0009* (2013.01); *B60C 1/0008* (2013.01); *B60C 5/14* (2013.01);
(Continued)

(58) Field of Classification Search
CPC ..... B60C 17/08; B60C 17/00; B60C 17/0009; B60C 2001/0033
See application file for complete search history.

(56) References Cited

U.S. PATENT DOCUMENTS 3,949,798 A 4/1976 Gardner et al.
4,742,124 A 5/1988 Tsutsumi et al.
(Continued)

FOREIGN PATENT DOCUMENTS

DE 10 2012 106309 A1 2/2014
EP 451604 A2 10/1991
(Continued)

OTHER PUBLICATIONS

International Search Report form the European Patent Office in corresponding International Application No. PCT/IB2021/055296 mailed Aug. 9, 2021.
(Continued)

*Primary Examiner* — Cedrick S Williams
(74) *Attorney, Agent, or Firm* — Finnegan, Henderson, Farabow, Garrett & Dunner, L.L.P.

(57) ABSTRACT

The present invention relates to self-supporting tyres for vehicle wheels having sidewall reinforcement inserts (113) with reduced rigidity. These tyres have a good mileage in flat running conditions, greater comfort and significantly reduced rolling resistance compared to known self-supporting tyres, with higher modulus sidewall reinforcement inserts.

16 Claims, 1 Drawing Sheet

(51) Int. Cl.
*B60C 5/14* (2006.01)
*B60C 9/00* (2006.01)

(52) U.S. Cl.
CPC ............ *B60C 9/0028* (2013.01); *B60C 9/005* (2013.01); *B60C 2001/0033* (2013.01); *B60C 2005/145* (2013.01)

(56) References Cited

U.S. PATENT DOCUMENTS

| | | | | |
|---|---|---|---|---|
| 5,526,863 | A | 6/1996 | Hodges | |
| 2004/0112496 | A1 | 6/2004 | Domenico et al. | |
| 2006/0016539 | A1 | 1/2006 | Colantonio et al. | |
| 2014/0190610 | A1 * | 7/2014 | Hayashi .................. | B60C 13/02 152/523 |
| 2020/0056014 | A1 | 2/2020 | Oishi | |

FOREIGN PATENT DOCUMENTS

| | | | | |
|---|---|---|---|---|
| EP | 1 242 256 | B1 | 9/2002 | |
| EP | 2408626 | B2 | 5/2013 | |
| EP | 2 700 513 | A1 | 2/2014 | |
| EP | 2271682 | B1 | 4/2016 | |
| EP | 2283046 | B1 | 10/2016 | |
| EP | 2895515 | B1 | 8/2017 | |
| EP | 3049447 | B1 | 6/2018 | |
| GB | 2 138 367 | A | 10/1984 | |
| JP | 2009062439 | A | 3/2009 | |
| JP | 2010-215831 | A | 9/2010 | |
| JP | 2014-19725 | A | 2/2014 | |
| WO | WO 02/096672 | A2 | 12/2002 | |
| WO | WO 02/096677 | A1 | 12/2002 | |
| WO | WO 2009/080144 | A1 | 7/2009 | |
| WO | WO 2015/086039 | A1 | 6/2015 | |
| WO | WO 2016/050887 | A1 | 4/2016 | |
| WO | WO-2018109661 | A1 * | 6/2016 | ............ B01J 23/745 |
| WO | WO 2017/211876 | A1 | 12/2017 | |
| WO | WO 2018/078480 | A1 | 5/2018 | |
| WO | WO-2018078500 | A1 * | 5/2018 | ......... B29D 30/0601 |
| WO | WO 2019/086785 | A1 | 5/2019 | |
| WO | WO 2019/092631 | A1 | 5/2019 | |
| WO | WO 2019/106562 | A1 | 6/2019 | |
| WO | WO 2019/229692 | A1 | 12/2019 | |
| WO | WO 2019/243713 | A1 | 12/2019 | |

OTHER PUBLICATIONS

Written Opinion of the International Searching Authority from the European Patent Office in corresponding International Application No. PCT/IB2021/055296 mailed Aug. 9, 2021.
Notification of the First Office Action issued by the China National Intellectual Property Administration on Jan. 26, 2025, in corresponding Application No. CN 202180041573.7 (8 pages).

* cited by examiner

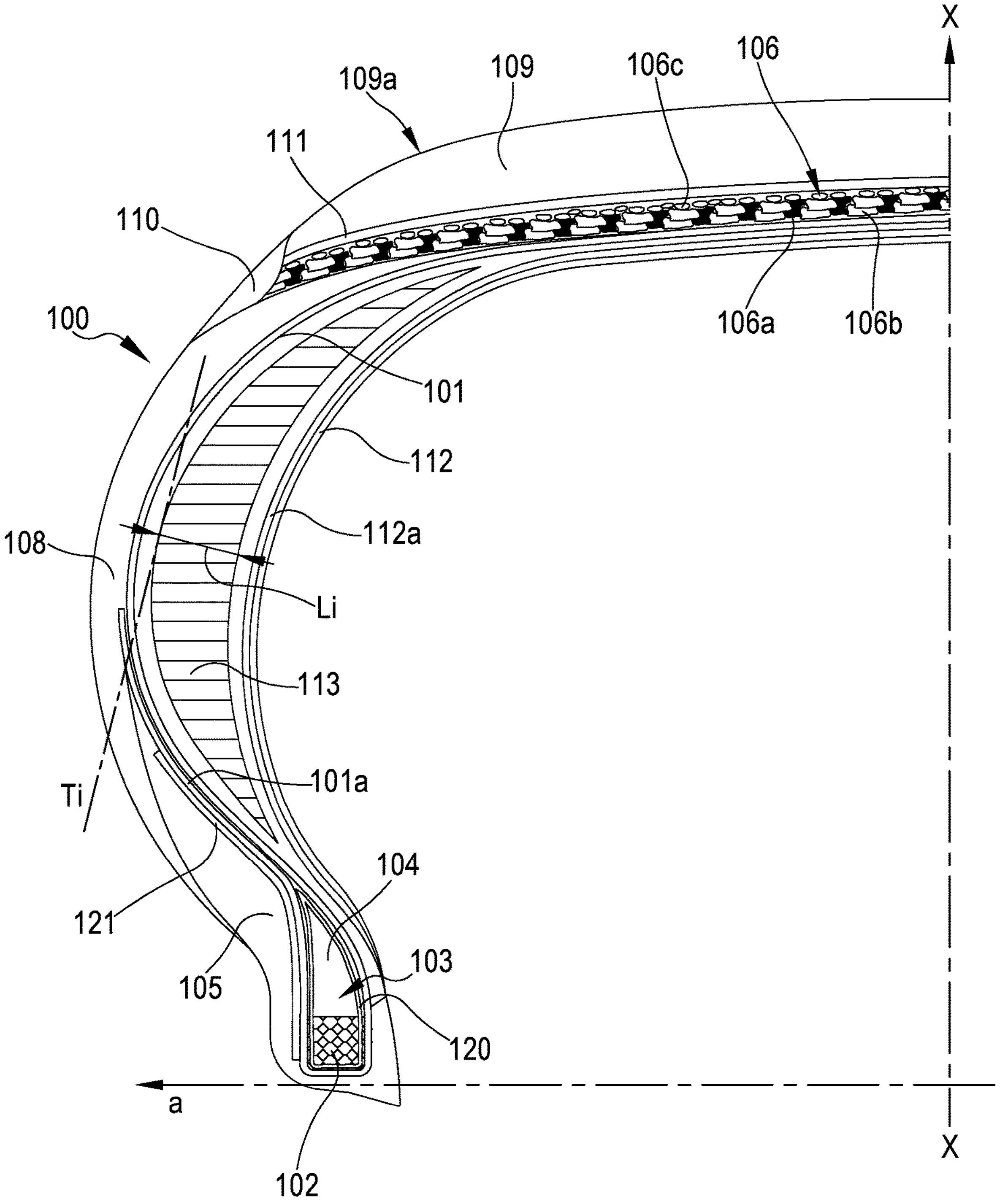
X
106
109a
109
106c
111
110
100
106a
106b
101
112
112a
108
Li
113
101a
Ti
121
104
103
105
120
a
102
X

SELF-SUPPORTING TYRE FOR VEHICLE WHEELS

This application is a national stage filing under 35 U.S.C. § 371 of International Application No. PCT/IB2021/055296, filed on Jun. 16, 2021, which claims the benefit of priority to Italian Application No. 102020000014512, filed on Jun. 17, 2020 and Italian Application No. 102020000032147, filed Dec. 23, 2020; the disclosure of each of these applications are each incorporated herein by reference in their entirety.

FIELD OF THE INVENTION

The present invention relates to a self-supporting tyre for vehicle wheels. In recent years, tyre manufacturers have sought to eliminate the need for a bulky spare wheel in the vehicle, while ensuring the ability for the vehicle to continue its trip despite a significant or total pressure loss of one or more tyres.

The spare wheel is now typically replaced by a reduced section wheel or by a repair/inflating kit which, however, require stopping and carrying out operations in often critical conditions.

Self-supporting tyres are tyres capable of supporting the vehicle load under a considerable or total loss of pressure, allowing the driver to travel, for a certain distance, to reach a garage without having to stop waiting for roadside assistance or to replace/re-inflate the tyre in a potentially dangerous situation.

When the inflation pressure is significantly lower than the operating pressure, or even zero (this is called "run-flat" mode), the tyre must be capable of travelling a certain distance at a certain speed, for example 80 km at 80 km/h.

This performance, known as "EM" (Extended Mobility) performance, is required by legislation or by vehicle manufacturers to enable the manufacturer to present the tyre as suitable for flat running.

When the inflation pressure is close to the operating pressure (in this case one speaks of "normal driving" mode), it is desirable that the tyre has the highest possible performance, such as, inter alia, manoeuvrability, low weight, low rolling resistance and adequate comfort.

Therefore, the structure of a self-supporting tyre must have sufficient strength to prevent the sidewall structures and the internal surfaces from collapsing on themselves when the tyre is used in a deflated condition and, on the other hand, when the tyre is in normal inflation operating conditions, it must impart favourable qualities of comfort and poor rolling resistance.

Several techniques have been used to achieve the above support effect without compromising normal running conditions.

Thus, for example, to impart self-supporting characteristics to the tyre, i.e. the aforementioned ability to guarantee travel for short/medium distances at reduced or substantially zero inflation pressure, for example following a puncture, it is known to integrate into the sidewall structure of the tyre one or more sidewall reinforcement inserts of elastomeric material, generally having a lenticular and/or substantially semi-circular profile, in an axially external position with respect to the layer of air impermeable elastomeric material and axially internal to each of the sidewalls. These sidewall reinforcement inserts of elastomeric material have the purpose of adequately supporting the vehicle load when the normal inflation pressure of the tyre is reduced, for example following a puncture.

A self-supporting tyre for vehicle wheels thus configured therefore comprises:

- a carcass structure comprising at least one carcass ply having opposite lateral edges associated to respective annular anchoring structures;
- a belt structure applied in a position radially external to the carcass structure;
- a tread band applied in a position radially external to the belt structure;
- a pair of sidewall structures each including a sidewall extended in a position axially external to the carcass structure and extended radially between one of the annular anchor structures and an axially external portion of the tread band;
- a layer of air impermeable elastomeric material, called liner, applied in a radially internal position to the carcass structure; and
- at least one pair of sidewall structure reinforcement inserts, incorporated in the sidewall structures of the tyre in a position axially external to the layer of air impermeable elastomeric material and axially internal to each of the sidewalls.

PRIOR ART

In the field of self-supporting tyres, various embodiments have been proposed, aimed at imparting the required features of self-supporting capacity, without excessively penalizing the ride comfort and consumption at normal inflation pressure. These solutions are essentially diversified both in the physical-chemical features of the elastomeric materials used to make the sidewall reinforcement inserts, and in the number of sidewall inserts contemplated, as well as in their positioning in relation to the carcass ply or plies.

According to an approach suggested by the prior art, the self-supporting capacity is ensured by reinforcing the sidewall structures with at least one specific rubber insert, in a position axially external to the layer of air impermeable elastomeric material and axially internal to each of the sidewalls.

Typically, the sidewall reinforcement insert works by supporting the flat tyre. According to the prior art, it is believed that the insert should be made of a material with a high modulus, to ensure lift, low hysteresis to minimise rolling resistance and good elongation at break, mainly to allow mounting/dismounting of the tyre on the rim. Generally to identify the best compromise, in the development of the compound one starts from a high modulus one, unsatisfactory for the high rolling resistance and poor comfort, and proceeds by gradually reducing the thickness of the insert to decrease the rolling resistance until the minimum value that guarantees the required run-flat distance is identified. However, the result is unsatisfactory for the still high rolling resistance values.

In fact, the prior art teaches to impart a high modulus to the reinforcement inserts in different ways, for example by using elastomeric compounds loaded with high amounts of reinforcement materials and/or comprising elastomers with high modulus and/or reinforced by increasing the cross-linking density, using high amounts of vulcanising agents or additional cross-linking systems.

For example, document WO2009080144A1 describes a self-supporting tyre with sidewall reinforcement inserts comprising a cross-linked elastomeric material obtained by cross-linking an elastomeric composition loaded with 20-35 phr of particular diatomites and with 10-35 phr of at least one further reinforcement. The exemplified compounds comprise at least 50 phr of filler, i.e. at least 30.4% by weight, and are characterised by rather high modulus values E', higher than 6 MPa. Document US2020056014A discloses an elastomeric composition for sidewall reinforcement insert of self-supporting tyres containing a low molecular weight polymer and a vulcanisation accelerant. As regards the reinforcing filler, in the experimental part it shows only compositions containing 60 phr of carbon black, equal to 31% by weight.

Document JP2010215831A describes an elastomeric composition for sidewall reinforcement insert of self-supporting tyres containing two silicas with different surface area—in an overall amount indicated generically from 10 to 150 phr—and preferably also carbon black (par. 28). The total amount of filler, including silicas and carbon black, is from 40 to 170 phr (par. 30). Table 1 of the experimental part shows a composition comprising 35 phr of carbon black (Comparative example 2)— composition with poor driving performance and in particular flat running—while all the others contain 50 phr of total filler. The document does not disclose modulus values for the compositions described therein.

Document JP2014019725A describes an elastomeric composition for sidewall reinforcement insert of self-supporting tyres similar to the previous one, further comprising a particular functionalised polymer. One of the declared advantages, obtained thanks to the use of syndiotactic polybutadiene, is the increase in the rigidity of the composition so as to improve the flat running performance (par. 296). The compositions exemplified in the Tables (pages 63-67) comprise fillers in a total amount of at least 54 phr, comprising 50 phr of carbon black and from 4 to 155 phr of silica. The document does not disclose dynamic modulus values for the compositions described therein.

Document EP2700513A1 deals with the accumulation of heat in the bead of a self-supporting tyre, the possible serious damage when driving on a flat tyre and the improvement of its life which is achieved by forming dimples or lugs closer to the tyre bead. As regards the sidewall reinforcement layer, the document states that the complex elastic modulus (E*) of the material must be quite high, more precisely ranging from 6 to 12 MPa (claim 5). The description does not disclose any elastomeric composition in detail.

Document WO2019086785A1 describes self-supporting tyres comprising sidewall reinforcement inserts, wherein said inserts are formed from materials with a high modulus, in particular with a complex shear dynamic modulus G* generally at least equal to 1.0 MPa (claim 1), preferably at least equal to 1.9 MPa (claim 3) and, in the examples, equal to 3.15 MPa with a Tan Delta of 0.09, typical values of a very rigid and relatively dissipative material. The description does not disclose any elastomeric composition in detail.

Document U.S. Pat. No. 5,526,862 describes a self-supporting tyre for motorcycles whose carcass incorporates, on each of the sidewalls, an elastic support insert comprising a substantially rigid contrast core, made of elastomeric material with a high dynamic modulus of compression E' higher than 6 MPa and preferably in the range from 8 to 16 MPa. The document does not disclose any elastomeric composition in detail. Document EP1242256A1 describes a self-supporting tyre where each sidewall is reinforced with at least one wedge insert which comprises alternating regions of flexible material and of a more rigid material. The more rigid material limits the lateral expansion of the insert to provide good driving comfort during normal inflation and good sidewall reinforcement when running flat. The document does not disclose any elastomeric composition in detail nor does it report modulus or hysteresis values of the compounds constituting the sidewall reinforcement insert.

Document WO2019243713A1 describes an elastomeric composition for sidewall reinforcement insert of self-supporting tyres comprising at least 50 phr of butadiene elastomer, preferably functionalised, and in general from 5 to 30 phr of carbon black and from 2 to 30 phr of inorganic filler. The compositions exemplified in Table 1 contain from 30 to 60 phr of total filler (black, silica, gypsum and/or kaolin) and a high amount of polybutadiene (65 phr), predictors of high complex dynamic shear modulus values G*.

Documents WO02096677A1 and WO02096672A2 describe a self-supporting tyre where each side comprises a support system consisting of two adjacent inserts made of elastomeric materials. The first insert, closer to the outer sidewall, consists of an elastomer vulcanised with a sulphur system, while the second insert is made more rigid by cross-linking the elastomer with a peroxide catalyst and a metal salt of a carboxylic acid, for example zinc (meth) acrylate. The compositions shown in Table 1 all have a high content of polybutadiene, which contributes to rigidity, and especially when carbon black is present in smaller amounts (Ex. 4 and 5: 20 phr) or is absent (Ex. 6), they have an ever higher cross-linking system content (zinc acrylates ranging from 45 to 100 phr). By virtue of the cross-linking, these compounds have a very high rigidity, evidenced by the hardness values ShA, which for the second insert are higher than 90, by the tensile modulus for an elongation of 10% higher than 10 MPa (Table 2) and by the high values of shear modulus G', in the range from 10 to 50 MPa, as shown in the examples and claimed (claim 9).

In conclusion, in the prior art it appears consolidated that in this type of tyres it is necessary to have rather rigid sidewall reinforcement inserts in order to guarantee sufficient self-supporting capacity. However, this need appears in contrast with the need to minimise rolling resistance and to ensure sufficient ride comfort.

SUMMARY OF THE INVENTION

In light of the prior art, the Applicant has undertaken studies to improve the performance of self-supporting tyres, in particular to further reduce rolling resistance, and therefore fuel consumption, improving comfort and at the same time maintaining performance in run-flat conditions.

In this regard, the Applicant has perceived that during running under normal inflation conditions, which represents almost the entire time of use, the presence of sidewall reinforcement inserts with high elasticity modules imposes strong stresses and leads to an increase in rolling resistance as well as an undesired reduction in ride comfort.

The Applicant has found that it is possible to reconcile the need to impart to the tyre an even more reduced rolling resistance while allowing the desired self-supporting features for the minimum mileage required by the car manufacturers and better performance and comfort during normal driving.

This result has been obtained, surprisingly and contrary to what has been taught by the prior art, by reducing the rigidity of the sidewall reinforcement inserts—mainly by decreasing their reinforcing filler content, preferably also by using special white fillers instead of at least part of the conventional silica and possibly by selecting a less rigid elastomeric component—and possibly compensating for the decrease in self-supporting capacity with the increase in the thickness of the inserts. In this way, it was possible to achieve an unexpectedly improved overall result between rolling resistance and distance in flat running conditions compared to prior art self-supporting tyres characterised by more rigid, high modulus inserts. In fact, according to the present invention, the reduction of the modulus of the insert material has led to the maintenance or to a minimum, completely acceptable reduction, of the run-flat distance associated, however, with a considerable and unexpected increase in rolling resistance.

Therefore, the object of the present invention is a self-supporting tyre for vehicle wheels comprising

- a carcass structure having opposing side edges associated with respective annular anchoring structures;
- a belt structure applied in a position radially external to the carcass structure;
- a tread band applied in a position radially external to the belt structure;
- a pair of sidewall structures each including a sidewall extended in a position axially external to the carcass structure and extended radially between one of the annular anchor structures and an axially external portion of the tread band; and
- at least one pair of sidewall reinforcement inserts, each insert being embedded in the respective sidewall structure, at a position axially internal to each of the sidewalls, characterized in that at least one of said sidewall reinforcement inserts comprises, preferably consists of, an elastomeric compound having a shear modulus value G', measured at 70° C., 10 Hz, 9% strain according to the method disclosed in the present description, of less than 1.25 MPa.

Preferably, both of said sidewall reinforcement inserts comprise, preferably are consist of, said elastomeric compound.

Preferably, said elastomeric compound of said inserts is prepared by mixing and vulcanising an elastomeric composition comprising at least

- 100 phr of at least one diene elastomeric polymer,
- a total amount of less than 30% by weight of the total weight of the at least one reinforcing filler composition, and
- at least 0.1 phr of the at least one vulcanising agent.

Definitions

In the present description and following claims, the following definitions apply. The term "elastomeric composition" means a composition comprising at least one diene elastomeric polymer and one or more additives, which by mixing and possible heating provides an elastomeric compound suitable for use in tyres and components thereof.

The components of the elastomeric composition are not generally introduced simultaneously into the mixer but typically added in sequence. In particular, the vulcanisation additives, such as the vulcanising agent and possibly the accelerant and retardant agents, are usually added in a downstream step with respect to the incorporation and processing of all the other components.

In the final vulcanisable or even more vulcanised elastomeric compound, the individual components of the elastomeric composition may be altered or no longer individually traceable as modified, completely or in part, due to the interaction with the other components, of heat and/or mechanical processing.

The term "elastomeric compound" indicates the compound obtainable by mixing and possibly heating at least one elastomeric polymer with at least one of the additives commonly used in the preparation of tyre compounds.

The term "vulcanisable elastomeric compound" indicates the elastomeric compound ready for vulcanisation, obtainable by incorporation of all the additives, including those of vulcanisation.

The term "vulcanised elastomeric compound" means the material obtainable by vulcanisation of a vulcanisable elastomeric compound.

The term "green" indicates a material, a compound, a composition, a component or a tyre not yet vulcanised.

The term "vulcanisation" refers to the cross-linking reaction in a natural or synthetic rubber induced by a sulphur-based and/or peroxide-based vulcanising agent. The term "vulcanising agent" indicates a product capable of transforming natural or synthetic rubber into elastic and resistant material due to the formation of a three-dimensional network of stable inter- and intra-molecular bonds. Typically, the vulcanising agent is a sulphur-based compound such as elemental sulphur, polymeric sulphur, sulphurised agents such as bis[(trialkoxysilyl)propyl]polysulphides, thiurams, dithiodimorpholines and caprolactam-disulphide. Alternatively, the vulcanising agent is a peroxide which contains an 0-0 bond and can generate reactive radicals by heating.

The term "vulcanisation accelerant" means a compound capable of decreasing the duration of the vulcanisation process and/or the operating temperature, such as TBBS, sulphenamides in general, thiazoles, dithiophosphates, dithiocarbamates, guanidines, as well as sulphur donors such as thiurams.

The term "vulcanisation activating agent" indicates a product capable of further facilitating the vulcanisation, making it happen in shorter times and possibly at lower temperatures. An example of activating agent is the stearic acid-zinc oxide system.

In the case of peroxide vulcanising agents, an example of activator is given by polymethacrylates such as ethylene glycol dimethacrylate.

The term "vulcanisation retardant" indicates a product capable of delaying the onset of the vulcanisation reaction and/or suppressing undesired secondary reactions, for example N-(cyclohexylthio)phthalimide (CTP).

The term "vulcanisation package" is meant to indicate the vulcanising agent and one or more vulcanisation additives selected from among vulcanisation activating agents, accelerants and retardants.

The term "elastomeric polymer" or "elastomer" or "rubber" indicates a natural or synthetic polymer which, after vulcanisation, can be stretched repeatedly at room temperature to at least twice its original length and after removal of the tensile load substantially immediately returns with force to approximately its original length (according to the definitions of the ASTM D1566-11 Standard terminology relating to Rubber).

The term "diene elastomeric polymer" indicates an elastomeric polymer derived from the polymerization of one or more monomers, of which at least one is a conjugated diene.

The term "reinforcing filler" is meant to refer to a reinforcing material typically used in the sector to improve the mechanical properties of tyre rubbers, preferably selected from among carbon black, conventional silica, such as silica from sand precipitated with strong acids, preferably amorphous, diatomaceous earth, calcium carbonate, titanium dioxide, talc, alumina, aluminosilicates, kaolin, silicate fibres, derivatives thereof and mixtures thereof.

The term "white filler" is meant to refer to a conventional reinforcing material used in the sector selected from among conventional silica and silicates, such as sepiolite, paligorskite also known as attapulgite, montmorillonite, alloisite and the like, possibly modified by acid treatment and/or derivatised. Typically, white fillers have surface hydroxyl groups, possibly partially derivatised.

The term "mixing step (1) or first step" indicates the step of the preparation process of the elastomeric compound in which one or more additives can be incorporated by mixing and possibly heating, except for the vulcanising agent and the vulcanisation package which are fed in step (2). The mixing step (1) is also referred to as "non-productive step". In the preparation of a compound there may be several "non-productive" mixing steps which may be indicated with 1a, 1b, etc.

The term "mixing step (2) or second step" indicates the next step of the preparation process of the elastomeric compound in which the vulcanising agent and, possibly, other additives among which those of the vulcanisation package are introduced into the elastomeric compound obtained from step (1), and mixed in the material, at controlled temperature, generally at a compound temperature lower than 120° C., so as to give the vulcanisable elastomeric compound. The mixing step (2) is also referred to as "productive step". In the preparation of a compound there may be several "productive" mixing steps which may be indicated with 2a, 2b, etc.

The term "dynamic shear modulus" or "sliding modulus" G' means the ratio between the shear stress applied to a specimen of vulcanised elastomeric compound and the resulting deformation. The details of the experimental measurement method are reported in the present description.

The term "dynamic elastic compression or elongation modulus E'" means the ratio between the uniaxial compression or traction stress applied to a specimen of vulcanised elastomeric compound and the resulting deformation. The details of the experimental measurement method are reported in the present description. The term "axial extension" or "thickness" (L-i, insert width) of the sidewall reinforcement insert means the extension of such elements measured perpendicular to a plane tangent (Ti) to the external surface of the reinforcement insert.

The term "equatorial plane" of the tyre means a plane perpendicular to the rotation axis of the tyre and which divides the tyre into two symmetrically equal parts. The terms "radial" and "axial" and the expressions "radially internal/external" and "axially internal/external" are used with reference to a direction perpendicular and a direction parallel to the rotation axis of the tyre, respectively.

The terms "circumferential" and "circumferentially" are used with reference to the direction of the annular extension of the tyre, i.e. to the rolling direction of the tyre, which corresponds to a direction lying on a plane coinciding with or parallel to the equatorial plane of the tyre.

The terms: "cord" or "reinforcement cord" mean an element consisting of one or more thread-like elements (hereinafter also referred to as "threads") incorporated in a matrix of elastomeric material. According to the cases and the specific applications, the aforementioned thread-like elements can be made of textile and/or metal material.

By "reinforcement elements oriented in a substantially circumferential direction" it is meant that they form an angle of a few degrees (for example an angle between about 0° and 6°) with the equatorial plane of the tyre.

The term "phr" (acronym of "parts per hundred of rubbers") indicates parts by weight per 100 parts by weight of the total elastomeric base. Any additives (such as any elastomeric resins or extension oils) are not considered for the calculation of the 100 parts of the total elastomeric base.

Unless otherwise indicated, all the percentages are expressed as percentages by weight.

BRIEF DESCRIPTION OF THE FIGURE

FIG. 1 schematically shows a semi-sectional view of a self-supporting tyre for vehicle wheels according to the present invention.

DETAILED DESCRIPTION OF THE INVENTION

The present invention can have one or more of the preferred features set out below. They can be combined as desired according to the application requirements.

The present elastomeric composition comprises at least 100 phr of at least one diene elastomeric polymer.

The diene elastomeric polymer may be selected from those commonly used in sulphur-vulcanisable elastomeric compositions, which are particularly suitable for producing tyres, i.e. from among solid elastomeric polymers or copolymers with an unsaturated chain having a glass transition temperature (Tg) generally lower than 20° C., preferably in the range from 40° C. to −110° C.

These polymers or copolymers may be of natural origin or may be obtained by solution polymerization, emulsion polymerization or gas-phase polymerization of one or more conjugated dienes, optionally mixed with at least one comonomer selected from monoolefins, monovinylarenes and/or polar comonomers in an amount not exceeding 60% by weight.

The conjugated dienes generally contain from 4 to 12, preferably from 4 to 8 carbon atoms and may be selected, for example, from the group comprising: 1,3-butadiene, isoprene, 2,3-dimethyl-1,3-butadiene, 1,3-pentadiene, 1,3-hexadiene, 3-butyl-1,3-octadiene, 2-phenyl-1,3-butadiene and mixtures thereof.

The monoolefins can be selected from ethylene and α-olefins generally containing from 3 to 12 carbon atoms, such as for example propylene, 1-butene, 1-pentene, 1-hexene, 1-octene or mixtures thereof.

Monovinylarenes, which may optionally be used as comonomers, generally contain from 8 to 20, preferably from 8 to 12 carbon atoms and may be selected, for example, from: styrene; 1-vinylnaphthalene; 2-vinylnaphthalene; various alkyl, cycloalkyl, aryl, alkylaryl or arylalkyl derivatives of styrene, such as, for example, α-methylstyrene, 3-methylstyrene, 4-propylstyrene, 4-cyclohexylstyrene, 4-dodecylstyrene, 2-ethyl-4-benzylstyrene, 4-p-tolyl-styrene, 4-(4-phenylbutyl)styrene, and mixtures thereof. Styrene is particularly preferred.

Polar comonomers that may optionally be used, can be selected, for example, from among acrylic acid and alkylacrylic acid esters, acrylonitriles, or mixtures thereof, such as, for example, methyl acrylate, ethyl acrylate, methyl methacrylate, ethyl methacrylate, acrylonitrile and mixtures thereof.

The diene elastomeric polymer may be selected, for example, from among: cis-1,4-polyisoprene (natural or synthetic, preferably natural rubber), 3,4-polyisoprene, polybutadiene (in particular polybutadiene with a high content of 1,4-cis), optionally halogenated isoprene/isobutene copolymers, 1,3-butadiene/acrylonitrile copolymers, styrene/1,3-butadiene copolymers, styrene/isoprene/1,3-butadiene copolymers, styrene/1,3-butadiene/acrylonitrile copolymers, and mixtures thereof. The elastomeric composition may possibly comprise at least one polymer of one or more monoolefins with an olefinic comonomer or derivatives thereof. The monoolefins can be selected for example from among ethylene and α-olefins generally containing from 3 to 12 carbon atoms, such as for example propylene, 1-butene, 1-pentene, 1-hexene, 1-octene or mixtures thereof. Among these copolymers, ethylene/propylene (EPR) or ethylene/propylene/diene (EPDM) copolymers are preferred.

The above-mentioned polymers can optionally be functionalised along the main chain or at the ends thereof.

The functional group can be introduced into the elastomeric polymer by processes known in the art such as, for example, during the production of the elastomeric polymer by copolymerisation with at least one corresponding functionalised monomer containing at least one ethylene unsaturation; or by subsequent modification of the elastomeric polymer by grafting at least one functionalised monomer in the presence of a free radical initiator (for example, an organic peroxide).

Alternatively, the functionalisation can be introduced by reaction with suitable terminating agents or coupling agents. In particular, the diene elastomeric polymers obtained by anionic polymerization in the presence of an organometallic initiator (in particular, an organolithium initiator) may be functionalised by reacting the residual organometallic groups derived from the initiator with suitable terminating agents or coupling agents such as, for example, amines, amides, imines, carbodiimides, alkyltin halides, substituted benzophenones, alkoxysilanes, aryloxy silanes, alkylthiols, alkyldithiolsilanes, carboxyalkylthiols, carboxyalkylthiolsilanes, and thioglycols.

Useful examples of terminating agents or coupling agents are known in the art and described, for example in patents EP2408626, EP2271682, EP3049447A1, EP2283046A1, EP2895515A1, EP451604, U.S. Pat. No. 4,742,124, WO2015086039A1 and WO2017211876A1.

Preferably, said at least one functionalised elastomeric polymer is obtained from polybutadiene (in particular polybutadiene with a high 1,4-cis content), styrene/1,3-butadiene copolymers, styrene/isoprene/1,3-butadiene copolymers, styrene/1,3-butadiene/acrylonitrile copolymers, and mixtures thereof.

The elastomeric composition can comprise two or more elastomeric polymers as defined above, in a mixture.

Preferably, the elastomeric composition comprises polybutadiene in an amount of less than 50 phr, more preferably less than 30 phr, even more preferably less than 20 phr. Preferably, the elastomeric composition does not comprise polybutadiene. Preferably, the elastomeric composition comprises:

from 70 to 100 phr of a synthetic or natural polyisoprene or mixtures thereof, from 0 to 30 phr of a polybutadiene.

More preferably, the elastomeric composition comprises:

from 80 to 100 phr of a synthetic or natural polyisoprene or mixtures thereof, from 0 to 20 phr of a polybutadiene.

The term “polyisoprene” refers to isoprene polymers and copolymers.

The term “polybutadiene” refers to butadiene polymers and copolymers.

The elastomeric composition of said inserts comprises at least one reinforcing filler in a total amount preferably of less than 27%, more preferably less than 25% or 20% by weight with respect to the total weight of the composition.

Preferably, the reinforcing filler is present in a total amount in the range from 5% to 30% more preferably from 5% to 26% or from 10% to 20% by weight with respect to the total weight of the composition.

Preferably, the reinforcing filler is selected from carbon black, white fillers, silicate fibres, derivatives thereof and mixtures thereof.

In one embodiment, said reinforcing filler comprises carbon black.

Preferably, the carbon black is selected from those having a surface area not smaller than 20 $m^2/g$, preferably of about 40-50 $m^2/g$ (as determined by STSA—statistical thickness surface area according to ISO 18852:2005).

The carbon black may be, for example, N234, N326, N330, N375 or N550, N660 marketed by Birla Group (India) or by Cabot Corporation, preferably N550 or N660.

In an embodiment, said reinforcement filler is a white filler selected from among hydroxides, oxides and hydrated oxides, salts and hydrated salts of metals, silicates fibres, derivatives thereof and mixtures thereof.

In one embodiment, said reinforcing filler can comprise silica, for example selected from pyrogenic silica, precipitated amorphous silica, wet silica (hydrated silicic acid), anhydrous silica (anhydrous silicic acid), or mixtures thereof.

The silica that can be used in the present invention can have a BET surface area (measured according to ISO standard 5794/1) in the range from 10 $m^2/g$ to 300 $m^2/g$, preferably from 30 $m^2/g$ to 250 $m^2/g$, more preferably from 40 to 190 $m^2/g$. Commercial examples of suitable silicas are Zeosil 1165 MP, Zeosil 1115 MP, Zeosil 185 GR, Efficium from Solvay, Newsil HD90 and Newsil HD200 from Wuxi, K160 and K195 from Wilmar, H160AT and H180 AT from 10E, Zeopol 8755 and 8745 from Huber, Perkasil TF100 from Grace, Hi-Sil EZ 120 G, EZ 160G, EZ 200G from PPG, Ultrasil 7000 GR and Ultrasil 9100 GR from Evonik. Another example of suitable silica is the rice husk silica described in WO2019229692A1.

In one embodiment, said reinforcing filler comprises silica mixed with carbon black. In one embodiment, said reinforcing filler comprises a modified silica. Silica can be modified for example by reaction with silsequioxanes (as in WO2018078480A1), by reaction with pyrroles (as in WO2016050887A1) or by reaction with silanising agents, such as bis(triethoxysilylpropyl)tetrasulphide (TESPT), 3-aminopropyltriethoxysilane (APTES) 3-glycidyloxypropyltriethoxysilane triethoxy(octyl)silane, triethoxy(ethyl)silane, triethoxy-3-(2-imidazolin-1-yl)propylsilane, triethoxy-p-tolylsilane, triethoxy(l-phenylethenyl)silane, triethoxy-2-thienylsilane, 1H,1H,2H,2H-perfluorooctyltriethoxysilane, 3-(triethoxysilyl)propyl isocyanate, 1H,1H,2H,2H-perfluorodecylthriethoxysilane, isobutyltriethoxysilane, n-octadecyltriethoxysilane, (3-chloropropyl)triethoxysilane, triethoxysilane and 3-(triethoxysilyl)propionitrile.

Commercial examples of suitable silanising agents are Si69, Dynasilan AMEO and Dynasilan GLYEO from Evonik.

The modified silica may be a sulphurised silanised silica.

Sulfurised silanised silica is a silica prepared by reaction of a silica, such as fumed silica, precipitated amorphous silica, wet silica (hydrated silicic acid), anhydrous silica (anhydrous silicic acid), or mixtures thereof, or of a metal silicate, such as aluminium silicate, sodium silicate, potassium silicate, lithium silicate or mixtures thereof, with at least one sulfurised silanising agent.

The term “sulphur silanising agent” indicates an organic derivative of silicon containing mercapto, sulphide, disulphide or polysulphide groups, said derivative being capable of reacting with the OH groups of silica.

A commercial example of suitable sulfurised silanised silica is Agilon 400 silica from PPG.

In one embodiment, said reinforcing filler comprises a modified silica mixed with carbon black.

In one embodiment, said reinforcing filler comprises silicates.

In one embodiment, said silicates are lamellar silicates, such as bentonites, alloysite, laponite, saponite, vermiculite or hydrotalcite.

In one embodiment, said silicates are modified lamellar silicates analogously to what is described below for modified silicate fibres.

In one embodiment, said silicates are silicate fibres. These fibres typically have nano dimensions and have needle-like morphology.

The silicate fibres are preferably selected from sepiolite fibres, paligorskite fibres (also known as attapulgite), wollastonite fibres, imogolite fibres and mixtures thereof.

In one embodiment, said reinforcing filler comprises silicate fibres mixed with carbon black.

In one embodiment, said silicate fibres are modified silicate fibres.

In one embodiment, the modified silicate fibres can be for example fibres modified by acid treatment with partial removal of magnesium, such as those described and exemplified in patent application WO2016/174629A1.

In one embodiment, the modified silicate fibres can be for example fibres modified by deposition of amorphous silica on the surface, such as those described and exemplified in patent application WO2016/174628A1.

In one embodiment, the modified silicate fibres can be fibres organically modified by reaction, for example, with quaternary ammonium salts such as sepiolite fibres modified by reaction with talloyl benzyl dimethyl ammonium chloride marketed by Tolsa under the name Pangel B5.

In one embodiment, the modified silicate fibres can be fibres modified by reaction with a silanising agent selected for example from mono or bifunctional silanes with one or two or three hydrolysable groups such as bis-(3-triethoxysilyl-propyl)disulphide (TESPD), bis(3-triethoxysilyl-propyl) tetrasulphide (TESPT), 3-thio-octanoyl-1-propyl-triethoxysilane (NXT), $Me_2Si(OEt)_2$, $Me_2PhSiCl$, $Ph_2SiCl_2$.

In one embodiment, said reinforcing filler comprises modified silicate fibres mixed with carbon black.

In a preferred embodiment, said reinforcing filler comprises sepiolite fibres.

In a preferred embodiment, said reinforcing filler comprises a white filler prepared as described in WO2019106562A1.

Particularly preferred are the reinforcing filler M2 prepared according to Example 1, the reinforcing filler M4A prepared according to Example 2, and the reinforcing filler M6 prepared according to Example 3 of the patent application WO2019106562A1 in the name of the Applicant. These white charges will hereafter be referred to as: SilSep1 (reinforcing filler M2 prepared according to Example 1 of patent application WO2019/106562A1), SilSep2 (reinforcing filler M6 prepared according to Example 3 of patent application WO2019/106562A1) and SilSep3 (reinforcing filler M4A prepared according to Example 2 of patent application WO2019/106562A1).

In a preferred embodiment, said reinforcing filler comprises carbon black, silica and sepiolite fibres.

In a more preferred embodiment, said reinforcing filler comprises carbon black in the range from 0 to 10 phr, silica in the range from 5 to 20 phr and sepiolite fibres in the range from 5 to 20 phr.

In an even more preferred embodiment, said reinforcing filler comprises carbon black in the range from 0 to 6 phr and SilSep1 and/or SilSep2 and/or SilSep3 in a total amount in the range from 10 to 20 phr.

The Applicant has observed that the balance between rolling resistance and run-flat traveling is particularly favourable if part or all of the conventional silica in the elastomeric composition is replaced with SilSep1 and/or SilSep2 (see summary Table 8 and related comments).

The elastomeric composition for tyre compounds according to the invention may comprise from 0.1 to 10 phr of a vulcanising agent.

Preferably, the composition comprises at least 0.2 phr, 0.5 phr, 0.8 phr or 1 phr of at least one vulcanising agent.

Preferably, the composition comprises from 0.1 to 10 phr, from 0.2 to 10 phr, from 1 to 10 phr or from 1.5 to 5 phr of at least one vulcanising agent.

The at least one vulcanising agent is preferably selected from sulphur, or alternatively, sulphurised agents (sulphur donors), such as, for example, bis[(trialkoxysilyl)propyl] polysulphides, thiurams, dithiodimorpholines and caprolactam-disulphide and mixtures thereof. Alternatively, the vulcanising agent is a peroxide which contains an 0-0 bond and can generate reactive radicals by heating.

Preferably, the vulcanising agent is sulphur, preferably selected from soluble sulphur (crystalline sulphur), insoluble sulphur (polymeric sulphur), (iii) oil-dispersed sulphur and mixtures thereof.

Commercial examples of vulcanising agents suitable for use in the elastomeric composition of the invention are Redball Superfine sulphur from International Sulfur Inc., Crystex™ OT 33 AS sulphur and Eastmann Crystex™ HS OT 20 sulphur. In the present elastomeric composition, the vulcanising agent may be used together with adjuvants such as vulcanisation activators, accelerants and/or retardants known to those skilled in the art.

The elastomeric composition may optionally comprise at least one vulcanisation activating agent.

The vulcanisation activating agents suitable for use in the present elastomeric composition are zinc compounds, in particular ZnO, $ZnCO_3$, zinc salts of saturated or unsaturated fatty acids containing from 8 to 18 carbon atoms, which are preferably formed in situ in the elastomeric composition by reaction of ZnO and of the fatty acid or mixtures thereof. For example, zinc stearate is used, preferably formed in situ in the elastomeric composition, by ZnO and fatty acid, or magnesium stearate, formed by MgO, or mixtures thereof.

The vulcanisation activating agents may be present in the elastomeric composition of the invention in amounts preferably from 0.2 phr to 15 phr, more preferably from 1 phr to 5 phr.

Preferred activating agents derive from the reaction of zinc oxide and stearic acid. An example of activator is the product Aktiplast ST marketed by Rheinchemie.

The elastomeric composition may further comprise at least one vulcanisation accelerant.

Vulcanisation accelerants that are commonly used may be for example selected from dithiocarbamates, guanidines, thioureas, thiazoles, sulphenamides, sulphenimides, thiurams, amines, xanthates, or mixtures thereof.

Preferably, the accelerant agent is selected from mercaptobenzothiazole (MBT), N-cyclohexyl-2-benzothiazol-sulphenamide (CBS), N-tert-butyl-2-benzothiazol-sulphenamide (TBBS) and mixtures thereof.

Commercial examples of accelerants suitable for use in the present elastomeric composition are N-cyclohexyl-2-benzothiazyl-sulphenamide Vulkacit® (CBS or CZ), and N-terbutyl 2-benzothiazyl sulphenamide, Vulkacit® NZ/EGC marketed by Lanxess.

Vulcanisation accelerants may be used in the present elastomeric composition in an amount preferably from 0.05 phr to 10 phr, preferably from 0.1 phr to 7 phr, more preferably from 0.5 phr to 5 phr.

The elastomeric composition may optionally comprise at least one vulcanisation retardant agent.

The vulcanisation retardant agent suitable for use in the present elastomeric composition is preferably selected from urea, phthalic anhydride, N-nitrosodiphenylamine N-cyclohexylthiophthalimide (CTP or PVI) and mixtures thereof.

A commercial example of a suitable retardant agent is N-cyclohexylthiophthalimide VULKALENT G of Lanxess.

The vulcanisation retardant agent may be present in the present elastomeric composition in an amount of preferably from 0.05 phr to 2 phr.

The present elastomeric composition may comprise one or more vulcanisation retardant agents as defined above in a mixture.

Depending on the elastomeric composition, the man skilled in the art can adapt the composition of the vulcanisation package and the cross-linking conditions in order to impart a cross-linking degree to the vulcanised elastomeric compound commensurate with the non-exceeding of the shear modulus value G' set according to the present invention.

The elastomeric composition may further comprise at least 0.05 phr, preferably at least 0.1 phr or 0.5 phr or 0.7 phr, more preferably at least 1 phr or 2 phr of at least one silane coupling agent capable of interacting with the silica-based reinforcing fillers and to bind them to elastomeric polymers during vulcanisation.

Preferably, the silane coupling agent is present in an amount of at least 7% by weight, more preferably at least 9% by weight with respect to the weight of white filler.

Preferably, the elastomeric composition comprises from 0.1 phr to 20.0 phr or from 0.5 phr to 10.0 phr, even more preferably from 1.0 phr to 5.0 phr of at least one silane coupling agent.

Preferably, said coupling agent is a silane coupling agent selected from those having at least one hydrolysable silane group which can be identified, for example, by the following general formula (III):

$$(R')_3Si—C_nH_{2n}—X \qquad (III)$$

wherein the groups R', equal or different from each other, are selected from: alkyl, alkoxy or aryloxy groups or from halogen atoms, provided that at least one of the groups R' is an alkoxy or an aryloxy group; n is an integer of from 1 to 6; X is a group selected from: nitrose, mercapto, amino, epoxide, vinyl, imide, chloro, $—(S)_mC_nH_{2n}—Si—(R')_3$ and —S—COR', wherein m and n are integers of from 1 to 6 and the groups R' are as defined above.

Particularly preferred silane coupling agents are bis(3-triethoxysilylpropyl)tetrasulphide, 3-thio-octanoyl-1-propyl-triethoxysilane (NXT) and bis(3-triethoxysilyl-propyl) disulphide. Said coupling agents may be added as such or in mixture with an inert filler (such as carbon black) so as to facilitate their incorporation into the elastomeric composition.

An example of the silane coupling agent is TESPT: bis(3-triethoxysilylpropyl)tetrasulphide Si69 marketed by Evonik.

The elastomeric composition may further comprise one or more additional ingredients, commonly used in the field, such as for example plasticising oils, resins, antioxidant and/or antiozonating agents (anti-aging agents), waxes, adhesives and the like.

For example, the elastomeric composition according to the present invention, in order to further improve the workability of the compound, may further comprise at least one plasticising oil.

The amount of plasticiser is preferably in the range from 0.5 to 10 phr, preferably from 1 to 7 phr.

The term "plasticising oil" means a process oil derived from petroleum or a mineral oil or a vegetable oil or a synthetic oil or combinations thereof.

The plasticising oil may be a process oil derived from petroleum selected from paraffins (saturated hydrocarbons), naphthenes, aromatic polycyclic and mixtures thereof.

Examples of suitable process oils derived from petroleum are aromatic, paraffinic, naphthenic oils such as MES (Mild Extracted Solvate), DAE (Distillate Aromatic Extract), TDAE (Treated Distillate Aromatic Extract), TRAE (Treated Residual Aromatic Extract), RAE (Residual Aromatic Extract) known in the industry.

The plasticising oil may be an oil of natural or synthetic origin derived from the esterification of glycerol with fatty acids, comprising glycerine triglycerides, diglycerides, monoglycerides or mixtures thereof.

Examples of suitable vegetable oils are sunflower, soybean, linseed, rapeseed, castor and cotton oil.

The plasticising oil may be a synthetic oil selected from among the alkyl or aryl esters of phthalic acid or phosphoric acid.

The elastomeric composition according to the present invention may further comprise at least one resin.

The resin is a non-reactive resin, preferably selected from among hydrocarbon resins, phenolic resins, natural resins and mixtures thereof.

The amount of resin is preferably in the range from 0.5 to 10 phr, more preferably from 1 to 5 phr.

The elastomeric composition may optionally comprise at least one wax.

The wax may be for example a petroleum wax or a mixture of paraffins.

Commercial examples of suitable waxes are the Repsol N-paraffin mixture and the Antilux® 654 microcrystalline wax from Rhein Chemie.

The wax may be present in the elastomeric composition of the invention in an overall amount generally from 0.1 phr to 5 phr, preferably from 0.5 phr to 3 phr. The elastomeric composition may optionally comprise at least one antioxidant agent.

The antioxidant agent is preferably selected from N-isopropyl-N'-phenyl-p-phenylenediamine (IPPD), N-(-1,3-dimethyl-butyl)-n'-phenyl-p-phenylenediamine (6PPD), N,N'-bis-(1,4-dimethyl-pentyl)-p-phenylenediamine (77PD), N,N'-bis-(1-ethyl-3-methyl-pentyl)-p-phenylenediamine (DOPD), N,N'-bis-(1,4-dimethyl-pentyl)-p-phenylenediamine, N,N'-diphenyl-p-phenylenediamine (DPPD), N,N'-ditolyl-p-phenylenediamine (DTPD), N,N'-di-beta-naphthyl-p-phenylenediamine (DNPD), N,N'-bis(1-methylheptyl)-p-phenylenediamine, phenylenediamine (44PD), N-phenyl-N-cyclohexyl-p-phenylenediamine, N-phenyl-N' -1-methylheptyl-p-phenylenediamine and the like, and mixtures thereof, preferably it is N-1,3-dimethyl-butyl-N-phenyl-p-phenylenediamine (6-PPD).

A commercial example of a suitable antioxidant agent is 6PPD from Solutia/Eastman or Santoflex produced by Flexsys.

The antioxidant agent may be present in the elastomeric composition in an overall amount preferably from 0.1 phr to 6 phr, more preferably from 0.5 phr to 4 phr.

The vulcanised elastomeric compound of the present invention can be characterised by the following dynamic and static mechanical properties.

The vulcanised elastomeric compound has a shear modulus value preferably of less than 1.20 MPa, more preferably less than 1.10 MPa, even more preferably less than 1.05 MPa, even more preferably less than 0.95 MPa measured at 70° C., 10 Hz, 9% deformation according to the RPA method reported in the present description.

The vulcanised elastomeric compound has a shear modulus value G' preferably in the range between 0.50 and 1.25 MPa, more preferably between 0.70 and 1.10 MPa.

The vulcanised elastomeric compound has a shear modulus value G' preferably higher than 0.50 MPa, more preferably higher than 0.70 MPa.

The vulcanised elastomeric compound has a dynamic compression modulus value E' preferably of less than 7.50 MPa, more preferably less than 6.00 MPa, even more preferably less than 5.00 MPa measured at 23° C., 10 Hz according to the method reported in the present description.

The vulcanised elastomeric compound has a dynamic compression modulus value E' preferably in the range from 3.00 to 8.00 MPa, more preferably from 3.50 to 7.50 MPa, even more preferably from 4.00 to 6.00 MPa.

The vulcanised elastomeric compound has a Tan Delta value preferably not higher than 0.080, more preferably not higher than 0.072, even more preferably not higher than 0.060 measured at 70° C., 10 Hz according to the RPA method reported in the present description.

The vulcanised elastomeric compound has a Tan Delta value preferably in the range from 0.030 to 0.080, more preferably from 0.035 to 0.072, even more preferably from 0.040 to 0.070 measured at 70° C., 10 Hz according to the RPA method reported in the present description.

The vulcanised elastomeric compound has an elongation at break value AR (%) preferably higher than 150%, more preferably higher than 200%, even more preferably higher than 230% measured according to the UNI 6065:2001 method. The vulcanised elastomeric compound has a tensile strength value CR (%) preferably of at least 5.0 MPa, preferably at least 7.0 MPa, more preferably at least 8.0 MPa, measured according to the UNI6065:2001 method.

The vulcanised elastomeric compound has a tensile strength value CR (%) preferably in the range from 6.0 to 25.0 MPa, preferably from 7.0 to 20.0 MPa, measured according to the UNI6065:2001 method.

In the self-supporting tyre of the present invention, the elastomeric composition described above is used to form the sidewall reinforcement inserts.

The sidewall reinforcement insert refers to a coating layer arranged inside the sidewall portion of the self-supporting tyre.

The sidewall reinforcement insert may be made up partially, substantially (for example more than 70% of its weight) or, preferably, completely of the vulcanised elastomeric compound of the invention.

In one embodiment, the sidewall reinforcement insert entirely consists of the present elastomeric compound.

In one embodiment, the self-supporting tyre of the invention comprises a single pair of sidewall reinforcement inserts, arranged one on each sidewall.

In one embodiment, the self-supporting tyre of the invention comprises two pairs of sidewall reinforcement inserts, each pair arranged in a sidewall.

In one embodiment, the sidewall reinforcement insert may have a layered structure (sandwich) consisting of a layer of the present elastomeric compound, of an internal reinforcement layer, for example a textile chafer, and of another layer of the present elastomeric compound, both in one variant symmetrical with the layers of compound of the same thickness, and asymmetrical.

In one embodiment, the sidewall reinforcement insert may have a layered structure consisting of a layer of the present elastomeric compound, an internal reinforcement layer, for example a further carcass ply, and another layer of the present elastomeric compound, wherein the further carcass ply is folded around the axially outermost reinforcement insert.

The sidewall reinforcement insert may have different shapes and thicknesses.

Typically, the sidewall reinforcement insert may have a half moon shape which gradually decreases in thickness in both terminal directions.

The sidewall reinforcement insert according to the tyre of the invention may have a maximum axial extension Li, for example, from a minimum of 3 mm to a maximum of 14 mm, preferably from 5 to 12 mm, more preferably from 7 to 10 mm, measured perpendicular to the plane Ti tangent to the outer surface of the sidewall reinforcement insert.

The man skilled in the art knows that typically the thickness of the sidewall reinforcement insert varies according to the type of tyre, in particular it depends on the section height of the tyre, the number of carcass layers, the stiffness of the carcass, i.e. the standard or extra load the tyre is designed for.

For example, in the case of a conventional self-supporting tyre with a nominal section height of 80 mm, the thickness of the sidewall reinforcement inserts typically ranges from 3 to 5 mm, in the case of a nominal section height of 100 mm, from 5 to 7 mm while in the case of nominal section height of 130 mm, from 7 to 10 mm.

In the tyre of the present invention, especially when the elastomeric composition comprises a particularly low amount of reinforcing filler and/or high modulus elastomeric polymers, the maximum axial extension of the sidewall reinforcement insert can be increased for example by 1.5 or 2 mm, up to a maximum of 14 mm, preferably no more than 11 mm, more preferably no more than 10 mm in total thickness.

In this way, it is possible to achieve the desired self-supporting features of the tyre even in the case of compounds with a particularly low modulus, taking advantage of a much lower rolling resistance.

Preferably, in the self-supporting tyre of the present invention, the reinforcing inserts of the two sidewall structures have the same thickness.

Preferably, in the self-supporting tyre of the present invention, the reinforcing inserts of the two sidewall structures have the same thickness and the same shape.

The sidewall reinforcement insert extends radially, for each sidewall of the tyre, from the bead portion to the shoulder portion.

In one embodiment, the sidewall reinforcement insert extends radially, for each sidewall of the tyre, from the tread end to the bead portion.

In one embodiment of the present tyre, the sidewall reinforcement inserts are arranged at a position axially internal to the carcass structure In one embodiment of the present tyre, the sidewall reinforcement inserts are arranged at a position axially external to the carcass structure.

An example of a reinforcement insert is the element (113) shown in section in FIG. 1.

A preferred embodiment of the self-supporting tyre of the invention comprises a carcass structure having opposing side edges associated with respective annular anchoring structures;

a belt structure applied in a position radially external to the carcass structure;

a tread band applied in a position radially external to the belt structure;

a pair of sidewall structures each including a sidewall extended in a position axially external to the carcass structure and extended radially between one of the annular anchor structures and an axially external portion of the tread band;

a layer of air impermeable elastomeric material, called liner, at the most radially internal position of the tyre and extending at least at the tread band; and at least one pair of sidewall reinforcement inserts, each insert being incorporated in the respective sidewall structure, in a position axially internal to each of the sidewalls and axially external to the layer of air impermeable elastomeric material, characterised in that said sidewall reinforcement inserts have a shear modulus value G', measured at 70° C., 10 Hz, 9% deformation according to the method reported in the present description, lower than 1.25 MPa.

In a preferred embodiment, said liner extends from one bead structure to the other.

When applicable, all the preferences described above for the tyre of the invention in general also characterise in particular the tyre of the invention comprising said liner.

Another component of the self-supporting tyre of the invention which can advantageously comprise the present elastomeric compound is the underliner.

The underliner (see element 112*a* in the representation of FIG. 1) is a layer of elastomeric material arranged in a position radially external to the liner, i.e. between the liner and the carcass structure, preferably for the entire extension of the liner.

In one embodiment of the present tyre, the underliner and liner extend only for the tread portion.

In one embodiment of the present tyre, the underliner and liner extend from one bead structure to the other.

Typically, the underliner consists of an elastomeric compound with a high content of reinforcing filler and high viscosity, in order to protect the liner from any movement of the carcass cords during the tyre conformation, in the tyre building process.

The Applicant has found that in the self-supporting tyres of the invention, the underliner, if present, can advantageously comprise or more preferably consist of the elastomeric compound of the invention, with low filler and reduced viscosity, with unexpected further advantages of rolling resistance and mileage in flat driving conditions.

Therefore, in a preferred embodiment, the self-supporting tyre of the invention comprises:

a carcass structure having opposing side edges associated with respective annular anchoring structures;

a belt structure applied in a position radially external to the carcass structure;

a tread band applied in a position radially external to the belt structure;

a pair of sidewall structures each including a sidewall extended in a position axially external to the carcass structure and extended radially between one of the annular anchor structures and an axially external portion of the tread band;

a layer of air impermeable elastomeric material, called liner, at the most radially internal position of the tyre extending at least at the tread band;

at least one pair of sidewall reinforcement inserts, each insert being embedded in the respective sidewall structure, at a position axially internal to each of the sidewalls, and a layer of elastomeric material, called underliner, in a position radially external to said liner, radially internal to said carcass structure, axially internal to said sidewall reinforcement inserts and extending, preferably, no further than the extension of the liner, characterised in that said sidewall reinforcement inserts and said underliner preferably comprise an elastomeric compound having a shear modulus value G', measured at 70° C., 10 Hz, 9% strain according to the method disclosed in the present description, of less than 1.25 MPa.

Preferably, also said elastomeric compound of said underliner is prepared by mixing and vulcanising an elastomeric composition comprising at least 100 phr of at least one diene elastomeric polymer, less than 30% by weight of the total weight of the at least one reinforcing filler composition, and at least 0.1 phr of the at least one vulcanising agent.

When applicable, all the preferences described above for the tyre of the invention in general also characterise in particular the tyre of the invention comprising said liner and underliner.

In the self-supporting tyre according to the present invention, on the most radially internal surface of the liner, further tyre components can be optionally applied, such as for example soundproofing systems, sealants or sensors.

The self-supporting tyre of the invention is suitable for four-wheeled vehicles for road use, as tyres adapted to equip medium and high powered cars for transporting people (maximum chord size from 195 mm to 245 mm).

The Applicant believes that the invention is also adapted for tyres for small cars or high-performance tyres (HP high performance—UHP ultra high performance) with maximum chord size, for example, from 145 mm to 355 mm.

These tyres are preferably mounted on rims having seating diameters equal to or larger than 13 inches, preferably not larger than 24 inches, more preferably of between 16 inches and 23 inches.

In general, the tyre according to the invention can be a tyre for passenger cars, including both automobile tyres, such as for example the high-performance tyres defined below, and tyres for light transport vehicles, for example vans, campers, pick-up, typically with total mass at full load equal to or less than 3500 kg. Therefore, tyres for heavy transport vehicles are excluded.

The tyres of the invention can also be used in vehicles other than the aforementioned cars, for example in high-performance road and sports motorcycles, i.e. motorcycles capable of reaching speeds even higher than 270 km/h. Such motorcycles are those that belong to the category typically identified with the following classifications: hypersport, supersport, sport touring, and for lower speed ratings: scooter, street enduro and custom.

The term "tyre for motorcycle wheels" means a tyre having a high curvature ratio (typically greater than 0.200), capable of reaching high angles of inclination (roll angles) of the plane of symmetry of the motorcycle with respect to the vertical plane, during cornering of the motorcycle.

The self-supporting tyre may be an HP (High Performance) or UHP (Ultra High Performance) tyre intended for equipping vehicles for the transport mainly of people, such as Sedan, Minivan, family, SUVs (Sport Utility Vehicles) and/or CUVs (Crossover Utility Vehicles), typically tyres that allow driving at high speeds.

The high and ultra-high performance tyres are in particular those which allow to reach speeds higher than at least 160 km/h, higher than 200 km/h up to over 300 km/h. Examples of such tyres are those belonging to the classes "T", "U", "H", "V", "Z", "W", "Y" according to the E.T.R.T.O.—(European Tyre and Rim Technical Organisation) standards, in particular for four-wheel high-power vehicles. Typically, the tyres belonging to these classes have a section width equal to 185 mm or greater, preferably not greater than 325 mm, more preferably of between 195 mm and 325 mm. These tyres are preferably mounted on rims having seating diameters equal to or larger than 15 inches, preferably not larger than 24 inches, more preferably of between 17 inches and 22 inches. By SUV and CUV it is meant vehicles with raised distribution, typically four-wheel drive, typically having a displacement greater than or equal to 1800 cc, more preferably of between 2000 cc and 6200 cc. Preferably, these vehicles have a mass greater than 1,400 kg, more preferably of between 1500 Kg and 3000 Kg.

The tyre of the invention can be used as a summer or winter or "all-season" (tyres usable in all seasons) tyre.

Description of a Tyre According to the Invention

Further features and advantages of the self-supporting tyre according to the invention will become apparent from the following description of a preferred embodiment thereof, given below by way of non-limiting example, to be read with reference to the attached FIG. 1, which is not to scale.

FIG. 1 is a radial half-section view of a portion of a preferred embodiment of a self-supporting tyre according to the present invention.

In FIG. 1, reference numeral (100) indicates a self-supporting tyre for vehicle wheels according to a preferred embodiment of the invention.

In the embodiment shown in FIG. 1, the tyre (100) is of the type for motor vehicles.

In FIG. 1, "a" indicates an axial direction and "X" indicates a radial direction, in particular X-X indicates the outline of the equatorial plane. For simplicity, FIG. 1 shows only a portion of the tyre, the remaining portion not shown being identical and arranged symmetrically with respect to the equatorial plane "X-X".

Tyre (100) for four-wheeled vehicles comprises at least one carcass structure, comprising at least one carcass layer (101) having respectively opposite end flaps engaged with respective annular anchoring structures (102), referred to as bead cores, possibly associated to a bead filler (104).

The tyre area comprising the bead core (102) and the filler (104) forms a bead structure (103) intended for anchoring the tyre onto a corresponding mounting rim, not shown.

The carcass structure is usually of radial type, i.e. the reinforcing elements of the at least one carcass layer (101) lie on planes comprising the rotational axis of the tyre and substantially perpendicular to the equatorial plane of the tyre. Said reinforcing elements generally consist of textile cords. Each bead structure is associated to the carcass structure by folding back of the opposite lateral edges of the at least one carcass layer (101) around the annular anchoring structure (102) so as to form the so-called carcass flaps (101*a*) as shown in FIG. 1.

In one embodiment, the coupling between the carcass structure and the bead structure can be provided by a second carcass layer (not shown in FIG. 1) applied in an axially external position to the first carcass layer.

An anti-abrasive strip (105) possibly made with elastomeric material is arranged in an outer position of each bead structure (103).

The carcass structure is associated to a belt structure (106) comprising one or more belt layers (106*a*), (106*b*) placed in radial superposition with respect to one another and with respect to the carcass layer, having typically textile and/or metallic reinforcing cords incorporated within a layer of elastomeric material.

Such reinforcing cords may have crossed orientation with respect to a direction of circumferential development of the tyre (100). By "circumferential" direction it is meant a direction generally facing in the direction of rotation of the tyre. At least one zero-degree reinforcement layer (106*c*), commonly known as a "0° belt", may be applied in a radially outermost position to the belt layers (106*a*), (106*b*), which generally incorporates a plurality of elongated reinforcing elements, typically metallic or textile cords, oriented in a substantially circumferential direction, thus forming an angle of a few degrees (such as an angle of between about 0° and 6°) with a direction parallel to the equatorial plane of the tyre, and coated with an elastomeric material.

The tyre (100) can also comprise a further belt layer (not shown) disposed between the carcass structure (101) and the radially innermost belt layer of the aforementioned belt layers (106*a*), (106*b*) and comprising a plurality of reinforcing cords having an inclined orientation with respect to the circumferential direction of the tyre (100), or to the equatorial plane X-X of the tyre (100), by an angle equal to 90°.

A tread band (109) is applied in a radially external position to the belt structure (106). Moreover, respective sidewalls (108) of elastomeric material are applied in an axially outer position on the lateral surfaces of the carcass structure, each extending from one of the lateral edges of tread (109) at the respective bead structure (103).

A rubber layer (112), generally known as a "liner", which provides the necessary inflation air impermeability to the tyre, can be present in a position radially internal to the carcass layer (101).

A layer of elastomeric material, underliner (112*a*), can also be provided in a position radially external to said liner (112), According to a preferred embodiment of the invention, the underliner (112*a*) is made with the present elastomeric compound.

The sidewalls (108) of the tyre (100) also comprise a pair of respective sidewall reinforcement inserts (113), made with the present elastomeric compound.

The sidewall reinforcement inserts (113) are incorporated in the sidewall structures in a position axially external to the underliner (112*a*) and axially internal to the carcass layer (101).

In the embodiment illustrated in FIG. 1, the sidewall reinforcement inserts (113) have a maximum axial extension Li measured in a direction perpendicular to the plane $T_i$ tangent to the outer surface of the sidewall reinforcement insert (113), In a radially outer position, the tread band (109) has a rolling surface (109*a*) intended to come in contact with the ground. Circumferential grooves, which are connected by transverse notches (not shown in FIG. 1) so as to define a plurality of blocks of various shapes and sizes distributed over the rolling surface (109*a*), are generally made on this surface (109*a*), which for simplicity is represented smooth in FIG. 1.

A strip consisting of elastomeric material (110), commonly known as "mini-sidewall", can optionally be provided in the connecting zone between the sidewalls (108) and the tread band (109), this mini-sidewall being generally obtained by co-extrusion with the tread band (109) and allowing an improvement of the mechanical interaction between the tread band (109) and the sidewalls (108). Preferably, the end portion of the sidewall (108) directly covers the lateral edge of the tread band (109).

The rigidity of the tyre sidewall (108) can be improved by providing the bead structure (103) with a reinforcing layer (120) generally known as flipper or additional strip-like insert.

Flipper (120) is a reinforcing layer which is wound around the respective bead core (102) and the bead filler (104) so as to at least partially surround them, said reinforcing layer being arranged between the at least one carcass layer (101) and the bead structure (103). Usually, the flipper is in contact with said at least one carcass layer (101) and said bead structure (103).

Flipper (120) typically comprises a plurality of textile cords incorporated within a layer of elastomeric material.

The reinforcing annular structure or bead (103) of the tyre may comprise a further protective layer which is generally known by the term of "chafer" (121) or protective strip and which has the function of increasing the rigidity and integrity of the bead structure (103).

Chafer (121) usually comprises a plurality of cords incorporated within a rubber layer of elastomeric material. Such cords are generally made of textile materials or metallic materials.

A layer or sheet of elastomeric material can be arranged between the belt structure and the carcass structure (not shown).

Optionally, in the self-supporting tyre of the invention, the present elastomeric compound can be advantageously incorporated, if present, also in the underliner (112*a*) as well as in the reinforcement inserts (113).

The building of the tyre (100) as described above, can be carried out by assembling respective semi-finished products adapted to form the components of the tyre, on a forming drum, not shown, by at least one assembling device.

At least a part of the components intended to form the carcass structure of the tyre may be built and/or assembled on the forming drum. More specifically, the forming drum is suitable for receiving first any liners and underliners, the sidewall reinforcement inserts and subsequently the carcass structure. Thereafter, devices non shown coaxially engage one of the annular anchoring structures around each of the end flaps, position an outer sleeve comprising the belt structure and the tread band in a coaxially centred position around the cylindrical carcass sleeve and shape the carcass sleeve according to a toroidal configuration through a radial expansion of the carcass structure, so as to cause the application thereof against a radially inner surface of the outer sleeve.

After building of green tyre, a moulding and vulcanisation treatment is generally carried out in order to determine the structural stabilisation of the tyre through cross-linking of the elastomeric compositions, as well as to impart a desired tread pattern on the tread band and to impart any distinguishing graphic signs at sidewalls. The following examples are now provided for merely illustrative and non-limiting purposes.

EXAMPLES

Evaluation methods

The static mechanical properties (CA1 load at 100% elongation, CR tensile strength, AR % elongation at break) according to the UNI 6065:2001 standard were measured at 23° C. on samples of elastomeric materials, vulcanised at 170° C. for 10 minutes. The compressive dynamic mechanical properties E' and Tan delta were measured using an Instron model 1341 dynamic device in the tension-compression mode as described herein. A test piece of cross-linked material (170° C. for 10 minutes) having a cylindrical shape (length=25 mm; diameter=14 mm), preloaded in compression up to a longitudinal strain of 25% with respect to the initial length and maintained at the predetermined temperature of 23° C. for the whole duration of the test was subjected to a dynamic sinusoidal strain having an amplitude of ±3.5% with respect to the length under pre-load, with a frequency of 10 Hz. The dynamic mechanical properties are expressed in terms of dynamic elastic modulus (E') and Tan delta (loss factor). The Tan delta value was calculated as the ratio between the viscous dynamic module (E") and the dynamic elastic modulus (E').

The dynamic mechanical properties of shear and Tan delta dynamic modulus G' were evaluated using an Alpha Technologies R.P.A. 2000 oscillating chamber rheometer (Rubber Process Analyser) with chamber geometry as described in ASTM D6601-19 FIG. 1, applying the following method:

1) an approximately cylindrical test sample with a volume in the range from 4.6 to 5 $cm^3$ was obtained by punching a sheet with a thickness of at least 5 mm of the green vulcanisable elastomeric composition to be characterised;

2) the chambers of the RPA apparatus were preliminarily preheated to 170° C.;

3) the sample was loaded between the chambers of the RPA apparatus and the chambers were closed. Between the sample of the green vulcanisable elastomeric composition and each chamber of the RPA apparatus, two films were interposed to protect the chamber itself: in contact with the compound, a film of Nylon 6.6 cast of about 25 microns and in contact with the chamber of the RPA apparatus a polyester film of about 23 microns;

4) the sample was then vulcanised for a fixed time of 10 min at a temperature of 170° C. while recording the vulcanisation curve, i.e. subjecting the sample to a sinusoidal deformation of 7% amplitude and 1.67 Hz frequency for the entire duration of the vulcanisation;

5) the temperature of the chambers of the RPA apparatus was then brought to 70° C.; 10 minutes after the chamber temperature was set at 70° C., a sequence of dynamic measurements was performed at a constant temperature of 70° C. by sinusoidally stressing the sample in torsion at a fixed frequency of 10 Hz and amplitude progressively increasing from 0.3% to 10%, carrying out 10 stabilisation cycles and 10 measurement cycles for each condition;

6) again at 70° C., a dynamic measurement was then performed by sinusoidally stressing the sample in torsion at the fixed frequency of 10 Hz and amplitude of 9%, carrying out 10 stabilisation cycles and 20 measurement cycles: the result was expressed as average of what measured in the 20 measurement cycles, as dynamic shear modulus G' and as Tan Delta (ratio between viscous modulus G" and G', Tan Delta=G"/G').

Rolling Resistance (RR) Assessment

Rolling resistance (RR) measurements were carried out on the sample tyres thus produced according to the UNECE reg. 117 Rev.4 annex 6—ISO 28580:2018 (par. 4b (torque method))—Notification No. 2011-237 (Korea). The rolling resistance coefficient was expressed in N/kN.

The tyres thus tested were then assigned a relative rolling resistance index equal to the ratio of the rolling resistance measured for the tyre in question with respect to the reference tyre. The lower the value of this index, the lower the rolling resistance of the tyre under test and therefore the better its performance.

The results of the tests carried out are reported in Tables 3-7. In these Tables, a reduction in value (e.g. from 100 to 92) in the RR results represented improved performance while an increase in value (e.g. from 100 to 104) indicated deterioration.

Evaluation of the Distance Travelled in Deflation Conditions (Run Flat Test)

A BMW 5 Series car was equipped with four tyres, reference or invention, depending on the tyre group under consideration (see below Example 2, sample tyre preparation P1-P12).

A flat ride test was performed for each group of tyres by completely deflating the left rear tyre and driving on a mixed route at a travel speed not exceeding 80 km/h until the tyre was evidently damaged.

The test was repeated twice for each tyre group and the results averaged.

In order to compare the performance of the tyres, an "RF" distance index of 100 was assigned to a reference tyre for each group of tyres being compared.

A relative "RF" index was then assigned to the other tyres of the same group, corresponding to the ratio between the distance in flat running conditions measured for the test tyres compared to that of the reference tyre, set at 100, said distances having been measured in close comparison.

The results are reported in Tables 3-7 and in summary Table 8.

In these Tables, maintaining or moderately decreasing the value (e.g. from 100 to 75) in flat driving results represented comparable or entirely acceptable performance even if slightly worsened. An increase in the value (e.g. from 100 to 120) indicated an improved performance, i.e. a longer distance while a significant decrease in the value (e.g. less than 65) indicated an unacceptable performance.

Example 1: Preparation of Elastomeric Compounds for Sidewall Reinforcement Insert The reference compositions and the compositions according to the tyre of the invention reported in the following Table 1 were prepared as elastomeric compositions for the sidewall reinforcement insert:

TABLE 1

| Elastomeric compositions (phr) | Compositions | | | | | | | | |
|---|---|---|---|---|---|---|---|---|---|
| | Ref. 1 | Ref. 2 | Ref. 3 | Inv. 1 | Inv. 2 | Inv. 3 | Inv. 4 | Inv. 5 | Inv. 6 |
| NR | — | — | — | 80 | — | 60 | — | — | 80 |
| IR | 40 | 40 | 70 | 20 | 100 | 20 | 100 | 100 | 20 |
| BR | 60 | 60 | 30 | — | — | 20 | — | — | — |
| N-550 | 35.0 | 32.0 | — | — | 36.0 | — | — | — | — |
| Silica | 20.0 | — | — | 36.0 | — | 18.0 | — | — | — |
| SilSep2 | — | 20.0 | 40.0 | — | — | 15.0 | 20 | 20 | — |
| SilSep1 | — | — | — | — | — | — | — | — | 16.0 |
| Stearic acid | 2.0 | 2.0 | 2.0 | 2.0 | 2.0 | 2.0 | 2.0 | 2.0 | 2.0 |
| Zinc oxide | 4.0 | 4.0 | 4.0 | 4.0 | 4.0 | 4.0 | 4.0 | 4.0 | 4.0 |
| TESPT 50% on CB | 5.0 | 5.0 | 8.0 | 7.0 | 7.0 | 7.0 | 7.0 | 7.0 | 4.0 |
| TMQ | 1.0 | 1.0 | 1.0 | 1.0 | 1.0 | 1.0 | 1.0 | 1.0 | 1.0 |
| 6-PPD | 2.0 | 2.0 | 2.0 | 2.0 | 2.0 | 2.0 | 2.0 | 2.0 | 2.0 |
| TBBS | 1.5 | 2.5 | 2.0 | 1.9 | 1.9 | 1.9 | 1.9 | 1.9 | 1.9 |
| Isobutyl TUADS | 1.0 | 0.5 | 0.5 | — | — | — | — | 0.3 | 0.3 |
| Sulphur | 2.0 | 2.3 | 2.3 | 3.6 | 3.6 | 3.6 | 3.6 | 3.6 | 3.6 |
| Total Phr | 173.5 | 171.3 | 161.8 | 157.5 | 157.5 | 154.5 | 141.5 | 141.8 | 134.8 |
| Total filler (%) | 33 | 32 | 27 | 25 | 25 | 24 | 17 | 17 | 13 |

where Ref.=reference, Inv. =Invention and

IR: synthetic polyisoprene (SKI-3 Nizhnekamskneftekhim); NR natural rubber (Standard Thai Rubber STR 20—Thaiteck Rubber); BR: polybutadiene (Europrene Neocis®—Polymers Europe); N550: carbon black (N550 Birla Carbon); Silica: ZEOSIL 1115 HP (Solvay); SilSep1: white filler in M2 microbeads prepared according to Example 1 of patent application WO2019106562A1; SilSep2: white filler in M6 microbeads prepared according to Example 3 of patent application WO2019106562A1; Stearic acid: STEARINA N (SOGIS); Zinc oxide: Rhenogran® ZnO-80 (RheinChemie); TESPT 50% on CB: Mixture of Bis(triethoxysilylpropyl)tetrasulphide (TESPT 50%) supported on carbon black (50%), produced by Evonik Industries AG, Germany; TMQ (anti-ageing): polymerised NAUGARD Q (CHEMTURA CORPORATION); 6-PPD (antioxidant): N-(1,3-dimethylbutyl)-N'-phenyl-p-phenylene-diamine (Santoflex™ 6PPD—Eastman); TBBS (accelerant): N-tert-butyl-2-benzothiazylsulphenamide (Vulkacit® NZ/EGC—Lanxess); Isobutyl TUADS (lsobutylthiuram disulphide) accelerant produced by RTVanderbilt; Sulphur (vulcaniser): insoluble 67%, Solfotecnica. Starting from the elastomeric compositions shown in Table 1, the corresponding elastomeric compounds were prepared according to the following process. The mixing of the components was carried out in two steps using an internal mixer (Banbury, Intermix or Brabender).

In the first step (1), all the ingredients were introduced with the exception of vulcanisers and accelerants. The mixing was continued for a maximum time of 5 minutes, reaching a temperature of approximately 145° C. Subsequently, in the second test (2), again carried out using an internal mixer, the vulcanisers and accelerants were added, and the mixing was continued for about 4 minutes while maintaining the temperature below 100° C. The compounds were then unloaded. After cooling and at least 12 hours from preparation, some samples of the compounds were vulcanised in a press at 170° C. for 10 min to give the specimens useful for mechanical characterisations.

Characterisation of the Compounds

The main static and dynamic properties of the aforementioned elastomeric compounds, measured by the methods described above, are shown in the following Table 2

TABLE 2

| Property | Ref. 1 | Ref. 2 | Ref. 3 | Inv. 1 | Inv. 2 | Inv. 3 | Inv. 4 | Inv. 5 | Inv. 6 |
|---|---|---|---|---|---|---|---|---|---|
| E' 23° C. 10 Hz | 8.29 | 9.32 | 9.47 | 4.21 | 4.03 | 4.93 | 3.97 | 4.86 | 4.68 |
| Tan D 23° C. 10 Hz | 0.094 | 0.072 | 0.074 | 0.060 | 0.071 | 0.074 | 0.052 | 0.042 | 0.036 |
| G' 70° C. 10 Hz (RPA) | 1.95 | 1.81 | 1.28 | 0.98 | 1.08 | 1.01 | 0.73 | 0.85 | 0.74 |
| Tan D 70° C. 10 Hz (RPA) | 0.101 | 0.090 | 0.073 | 0.065 | 0.071 | 0.070 | 0.053 | 0.045 | 0.049 |
| CA1 (MPa) | 4.18 | 5.14 | 6.30 | 2.03 | 2.33 | 2.54 | 3.16 | 4.89 | 3.39 |
| CR (MPa) | 12.1 | 12.3 | 14.7 | 20.1 | 19.4 | 17.3 | 19.8 | 12.9 | 8.3 |
| AR % | 255 | 244 | 246 | 488 | 426 | 476 | 488 | 260 | 275 |

Example 2: Production of Self-Supporting Tyres

In order to evaluate the performance of tyres with sidewall reinforcement inserts according to the present invention with respect to reference and comparative tyres, in terms of rolling resistance and maximum mileage in deflation conditions, sets of eight tyres were prepared for each of the tyres P1-P12 having the features shown in Tables 3-7.

Each tyre included two sidewall reinforcement inserts, one internal and one external, in a position axially internal to each of the sidewalls, as shown in FIG. 1, said two inserts having the same composition, same thickness and same shape.

In each set, tyres were compared under the same operating conditions, modified only in terms of the elastomeric composition of the reinforcement inserts and/or their thickness, all other features of the inserts and tyres being equal.

Preparation of Sample Tyres

A first group of sample tyres included self-supporting tyres produced by the Applicant with dimensions 245/45 R18 100Y XL configured as follows:

- self-supporting tyre comprising sidewall reinforcement inserts consisting of the composition Ref. 1 with a maximum thickness (L-i) of 7 mm (tyre P1, reference);
- self-supporting tyre comprising sidewall reinforcement inserts consisting of the composition Ref. 2 of the same thickness (tyre P2/comparative);
- self-supporting tyre comprising sidewall reinforcement inserts made of the composition Ref. 2 with reduced thickness (tyre P3/comparative).

The main features of the self-supporting tyres of this first group and their rolling resistance and maximum mileage performance in deflation conditions, evaluated according to the methods described above, are shown in the following Table 3:

TABLE 3

| | Tyre | | |
|---|---|---|---|
| | P1 | P2 | P3 |
| IRF composition | Ref. 1 | Ref. 2 | Ref. 2 |
| Relative IRF thickness | 100 | 100 | 86 |
| Relative RR | 100 | 100 | 97 |
| Relative RF | 100 | 157 | 45 |

TABLE 3-continued wherein
IRF composition = elastomeric composition of the sidewall reinforcement inserts;
Relative IRF thickness = thickness re-parameterised by setting the thickness of the sidewall reinforcement inserts of the tyre P1 to be 100;
RR = relative rolling resistance re-parameterised by setting the RR of the tyre P1 to be 100;
RF = run flat, relative maximum mileage in conditions of deflation, i.e. in flat running, re-parameterised by setting the flat running mileage of the tyre P1 to be 100.

A second group of sample tyres included self-supporting tyres produced by the Applicant with dimensions 245/45 R18 100Y XL configured as follows:

- self-supporting tyre comprising sidewall reinforcement inserts consisting of the composition Ref. 1 with a maximum thickness L-i of 7 mm (tyre P4, reference);
- self-supporting tyre comprising sidewall reinforcement inserts consisting of the composition Ref. 3 of the same thickness (tyre P5/comparative).

The main features of the self-supporting tyres of this second group and their rolling resistance and maximum mileage performance in deflation conditions, evaluated according to the methods described above, are shown in the following Table 4:

TABLE 4

| | Tyre | |
|---|---|---|
| | P4 | P5 |
| IRF composition | Ref. 1 | Ref. 3 |
| Relative IRF thickness | 100 | 100 |
| Relative RR | 100 | 97 |
| Relative RF | 100 | 47 |

A third group of sample tyres included sell-supporting tyres produced by the Applicant with dimensions 225/45 R17 94Y XL RF configured as follows:

self-supporting tyre comprising sidewall reinforcement inserts consisting of the composition Ref. 1 with a maximum thickness L-i of 7 mm (tyre P6, reference);

self-supporting tyre comprising sidewall reinforcement inserts consisting of the composition Inv. 1 of the same thickness (tyre P7, invention).

The main features of the self-supporting tyres of this third group and their rolling resistance and maximum mileage performance in deflation conditions, evaluated according to the methods described above, are shown in the following Table 5:

TABLE 5

| | Tyre | |
|---|---|---|
| | P6 | P7 |
| IRF composition | Ref. 1 | Inv. 1 |
| Relative IRF thickness | 100 | 100 |
| Relative RR | 100 | 97 |
| Relative RF | 100 | 84 |

A fourth group of sample tyres included self-supporting tyres produced by the Applicant with dimensions 225/45 R19 RF configured as follows:

self-supporting tyre comprising sidewall reinforcement inserts consisting of the composition Ref. 1 with a maximum thickness L-i of 7 mm (tyre P8, reference);

self-supporting tyre comprising sidewall reinforcement inserts consisting of the composition Inv. 3 of the same thickness (tyre P9, invention).

The main features of the self-supporting tyres of this fourth group and their rolling resistance and maximum mileage performance in deflation conditions, evaluated according to the methods described above, are shown in the following Table 6:

TABLE 6

| | Tyre | |
|---|---|---|
| | P8 | P9 |
| IRF composition | Ref. 1 | Inv. 3 |
| Relative IRF thickness | 100 | 100 |
| Relative RR | 100 | 95 |
| Relative RF | 100 | 78 |

A fifth group of sample tyres included self-supporting tyres produced by the Applicant with dimensions 245/45 R18 100Y XL configured as follows:

self-supporting tyre comprising sidewall reinforcement inserts consisting of the composition Ref. 1 with a maximum thickness L-i of 7 mm (tyre P10, reference);

self-supporting tyre comprising sidewall reinforcement inserts consisting of the composition Inv. 6 of the same thickness (tyre P11, invention);

self-supporting tyre comprising sidewall reinforcement inserts consisting of the composition Inv. 6 with increased thickness (tyre P12, invention).

The main features of the self-supporting tyres of this fifth group and their rolling resistance and maximum mileage performance in deflation conditions, evaluated according to the methods described above, are shown in the following Table 7:

TABLE 7

| | Tyre | | |
|---|---|---|---|
| | P10 | P11 | P12 |
| IRF composition | Ref. 1 | Inv. 6 | Inv. 6 |
| Relative IRF thickness | 100 | 100 | 127 |
| Relative RR | 100 | 92 | 94 |
| Relative RF | 100 | 13 | 90 |

All the aforementioned tyres were prepared by assembling all the green components, and subsequent forming and vulcanisation.

The following Table 8 summarises the constitutive features of self-supporting tyres:

TABLE 8

| | Tyre | | | | | | | |
|---|---|---|---|---|---|---|---|---|
| | P1 P4 P6 P8 P10 | P2 | P3 | P5 | P7 | P9 | P11 | P12 |
| Compos. IRF | Ref. 1 | Ref. 2 | Ref. 2 | Ref. 3 | Inv. 1 | Inv. 3 | Inv. 6 | Inv. 6 |
| Filler | | | | | | | | |
| Carbon black | 35.0 | 32.0 | 32.0 | — | — | — | — | — |
| Silica | 20.0 | — | — | — | 36.0 | 18.0 | — | — |
| SilSep2 | — | 20.0 | 20.0 | 40.0 | — | 15.0 | — | — |
| SilSep1 | — | — | — | — | — | — | 16.0 | 16.0 |
| Tot. filler % | 33 | 32 | 32 | 27 | 25 | 24 | 13 | 13 |
| G' 70° C. 10 Hz | 1.95 | 1.81 | 1.81 | 1.28 | 0.98 | 1.01 | 0.74 | 0.74 |
| Rel. IRF thick. | 100 | 100 | 86 | 100 | 100 | 100 | 100 | 127 |
| Rel. RR | 100 | 100 | 97 | 97 | 97 | 95 | 92 | 94 |
| Rel. RF | 100 | 157 | 45 | 47 | 84 | 78 | 13 | 90 |

As can be seen in Tables 3-7 and in summary Table 8;

By comparing the compositions Ref. 1 and Ref. 2, it was observed that by replacing the conventional silica in the compound with the more reinforcing filler (SilSep1, SilSep2) a similar rigidity (E' at 23° C. and CA1 grow while G' remains substantially constant) and a reduced hysteresis (see Table 2) were obtained. Considering the corresponding data on tyres (P1, P2, P3 Table 3) it was noted that by replacing conventional silica in the composition of the reinforcement inserts with the more reinforcing filler, for the same thickness (tyre P1 compared to P2) there was a significant improvement of the distance in flat running (index from 100 to 157) but not of rolling resistance (constant index at 100); if, on the other hand, in addition to replacing the silica, the thickness of the sidewall reinforcement inserts was reduced by 14% (tyre P1 compared to P3), a significant reduction in rolling resistance was advantageously obtained, but at the expense of the distance in flat running whose index dropped from 100 at 45. The fluctuating trend of rolling resistance compared to the distance travelled in flat running demonstrated how difficult it was to find the right compromise between these properties.

By comparing the compositions Ref. 1 and Ref. 3, it was observed that by modifying the filler (i.e. by replacing the carbon black and silica with the more reinforcing filler SilSep1) and reducing the total amount thereof in the compound, a reduced rigidity in terms of shear modulus G', and a reduced hysteresis were obtained (see G', Tan D at 70° C. in Table 2). Considering the corresponding data on tyres (P4, P5 Table 4) it was noted that by modifying and reducing the total filler in the composition of the sidewall reinforcement inserts for the same thickness, there was a significant decrease in the rolling resistance (from 100 to 97) at the expense however, of the distance travelled in flat running which fell from 100 to 47. It could be imagined that the reduced hysteresis was responsible for the improvement in rolling resistance, while the worsening of distance in flat running could depend on the decrease in G'. These results would have discouraged from directing the research activity towards the reduction of the total filler and the value of G', in particular towards the use of the SilSep2 filler as the sole or prevalent reinforcing material.

By comparing the compositions Ref. 1 and Inv. 1, it was observed that by reducing the amount of total filler in the compound, using polyisoprene as the main polymer and modulating the vulcanisation system, a significantly decreased rigidity was obtained, in terms of E' and G', and a reduced hysteresis (see E' at 23° C., G' and Tan D at 70° C. in Table 2). Considering the corresponding data on tyres (P6, P7 Table 5) it was noted that by reducing the total filler in the composition of the sidewall reinforcement inserts for the same thickness, there was a significant decrease in the rolling resistance (from 100 to 97) with an acceptable decrease of the distance in flat running which dropped from 100 to 84.

By comparing the compositions Inv. 1 and Inv. 2, it was observed that by replacing Silica with Carbon Black, similar results were obtained (Table 2).

By comparing the compositions Ref. 1 and Inv. 3, it was observed that by modifying the filler (i.e. replacing part of the silica with the more reinforcing filler SilSep2), reducing the total amount thereof in the compound, using polyisoprene as the main polymer and modulating the vulcanisation system, a significantly decreased rigidity was obtained, in terms of E' at 23° C. and G' at 70° C., and a reduced hysteresis (see E' at 23° C., G' and Tan D at 70° C. in Table 2). Considering the corresponding data on tyres (P8, P9 Table 6) it was noted that by modifying and reducing the total filler in the composition of the sidewall reinforcement inserts for the same thickness, there was a significant decrease in the rolling resistance (from 100 to 95) with an acceptable decrease of the distance in flat running which dropped from 100 to 78.

By comparing the compositions Inv. 3 and Inv. 4 it was observed that by modifying the filler, i.e. completely replacing the silica with the more reinforcing filler SilSep2, and greatly reducing the total amount thereof in the compound, further reduced modules E' were obtained at 23° C. and G' at 70° C. and above all a strong decrease of the hysteresis, without virtually changing the tensile properties (Table 2).

By comparing the compositions Inv. 4 and Inv. 5, it was observed that by modifying the vulcanisation system, the properties of stiffness and hysteresis could be favourably modulated, increasing the stiffness also in traction (Table 2).

By comparing the compositions Inv. 5 and Inv. 6 it was observed that by modifying the filler, from SilSep2 to SilSep1, and further reducing the amount thereof, the properties of stiffness and hysteresis could be further refined.

By comparing the compositions Ref. 1 and Inv. 6, it was observed that by modifying the filler, i.e. replacing the silica with the more reinforcing filler SilSep1, greatly reducing the total amount thereof in the compound, using polyisoprene as the main polymer and modulating the vulcanisation system, a significantly decreased rigidity was obtained, in terms of E' at 23° C. and G', and a greatly reduced hysteresis (see E' at 23° C., G' and Tan D at 70° C. in Table 2). Considering the corresponding data on tyres (P10, P11, P12 Table 7) it was noted that by modifying and reducing the total filler in the composition of the sidewall reinforcement inserts for the same thickness, there was a very noticeable decrease in rolling resistance (from 100 to 92) but to the detriment of the distance in flat running condition which fell from 100 to 13 (tyre P10 vs P11); if, however, in addition to replacing the silica with the more reinforcing filler and reducing the total filler, the thickness of the sidewall reinforcement inserts was increased by 27% (tyre P10 compared to P12), it was recovered while travelling in flat running (from 13 to 90) with a minimum penalty of the rolling resistance (from 92 to 94), thus obtaining a remarkably advantageous overall result.

From these data it could be seen that the self-supporting tyres according to the present invention (P7, P8 and P12) were able to satisfy the minimum required distance in flat running condition.

In conclusion, from the above tests it was found that by reducing the rigidity of the sidewall reinforcement inserts of self-supporting tyres and, possibly, by compensating for the decrease in the self-supporting capacity with the increase in the thickness of the inserts, it was possible to achieve an overall advantageous result, since it was acceptable in terms of mileage in flat running conditions but unexpectedly improved compared to prior art self-supporting tyres, characterised by rigid inserts with a higher modulus, in both rolling resistance and comfort.

The invention claimed is:

1. A self-supporting tire for vehicle wheels comprising a carcass structure having opposing side edges associated with respective annular anchoring structures;

a belt structure applied in a position radially external to the carcass structure;

a tread band applied in a position radially external to the belt structure;

a pair of sidewall structures, wherein each includes a sidewall extended in a position axially external to the carcass structure and extends radially between one of the annular anchor structures and an axially external portion of the tread band; and at least one pair of sidewall reinforcement inserts, wherein each insert is embedded in the respective sidewall structure, at a position axially internal to each of the sidewalls, wherein both sidewall reinforcement inserts comprises an elastomeric compound having a shear modulus value G', measured at 70° C., 10 Hz, 9% strain according to a rubber process analyzer (RPA) method, of less than 1.25 MPa, wherein the elastomeric compound of the sidewall reinforcement inserts, before vulcanization, comprises an elastomeric composition comprising:

100 phr of at least one diene elastomeric polymer, one or more reinforcing fillers, wherein the total amount of the reinforcing fillers is from 5% to 26% by weight with respect to the total weight of the composition, and wherein the reinforcing fillers are selected from the group consisting of white fillers, silicate fibers, derivatives thereof and mixtures thereof, optionally in admixture with carbon black, and at least 0.1 phr of at least one vulcanizing agent.

2. The tire according to claim 1, wherein both the sidewall reinforcement inserts consist of the elastomeric compound.

3. The tire according to claim 1, wherein the elastomeric compound of the inserts has a dynamic compression elastic modulus value E' less than 7.50 MPa, as measured at 23° C., 10 Hz with an Instron model 1341 dynamic devices in the traction-compression mode.

4. The tire according to claim 1, wherein the elastomeric compound of the inserts has a Tan Delta value of not more than 0.080 measured at 70° C., 10 Hz according to the RPA method.

5. The tire according to claim 1, wherein the elastomeric compound of the inserts has an elongation at break AR (%) value greater than 150%, as measured according to ISO37 UNI6065 method.

6. The tire according to claim 1, wherein the elastomeric compound of the vulcanized inserts has a breaking load value CR (%) of at least 5.0 MPa, as measured according to ISO37 UNI6065 method.

7. The tire according to claim 1, wherein the sidewall reinforcement inserts have a maximum axial extension ranging from 3 mm to 14 mm, as measured in a direction perpendicular to the plane Ti tangent to the outer surface of the sidewall reinforcement insert.

8. The tire according to claim 1, wherein the sidewall reinforcement inserts have the same thickness.

9. The tire according to claim 1, wherein the shear modulus value G' is less than 1.20 MPa.

10. The tire according to claim 9, wherein the shear modulus value G' is less than 0.95 MPa.

11. The tire according to claim 1, further comprising a layer of an air impermeable elastomeric material called liner, at the most radially inner position of the tire and extending at least at the tread band.

12. The tire according to claim 11, further comprising a layer of elastomeric material called underliner, at a position radially external to the liner, radially internal to the carcass structure, axially internal to the sidewall reinforcement inserts, and extending, no further than the extension of the liner, wherein the underliner comprises the elastomeric compound.

13. The tire according to claim 1, wherein the elastomeric composition comprises polybutadiene in an amount less than 50 phr.

14. The tire according to claim 13, wherein the elastomeric composition does not comprise polybutadiene.

15. The tire according to claim 13, wherein the elastomeric composition comprises at least one reinforcing filler in a total amount of less than 27%, by weight relative to the total weight of the composition.

16. The tire according to claim 15, wherein the reinforcing filler comprises sepiolite and silica fibers.

* * * * *